United States Patent [19]
Mehta

[11] Patent Number: 5,345,109
[45] Date of Patent: Sep. 6, 1994

[54] PROGRAMMABLE CLOCK CIRCUIT

[75] Inventor: Anup S. Mehta, Folsom, Calif.

[73] Assignee: Intel Corporation, Santa Clara, Calif.

[21] Appl. No.: 39,951

[22] Filed: Mar. 30, 1993

[51] Int. Cl.5 .............................................. H03K 3/72
[52] U.S. Cl. .................. 307/271; 307/247.1; 328/62; 377/47
[58] Field of Search ................... 377/47, 48; 307/271, 307/289, 291, 259, 272.2, 529, 247.1; 328/15, 25, 30, 63, 72, 137, 62

[56] References Cited

U.S. PATENT DOCUMENTS

| | | | |
|---|---|---|---|
| 4,646,331 | 2/1987 | Ely | 377/47 |
| 4,651,334 | 3/1987 | Hayashi | 377/47 |
| 4,656,649 | 9/1987 | Takahashi | 307/271 |
| 5,248,904 | 9/1993 | Miyazaki et al. | 307/271 |

FOREIGN PATENT DOCUMENTS 63-14520  7/1986  Japan .

*Primary Examiner*—Timothy P. Callahan
*Assistant Examiner*—My-Trang Nu Ton
*Attorney, Agent, or Firm*—Blakely, Sokoloff, Taylor & Zafman

[57] ABSTRACT

The programmable clock circuit of the present invention provides the means to generate lower frequency clock signals from a higher clock frequency signal while maintaining the synchronous relationship of the signals as well as compatible electrical characteristics of the signal. The advantages to the circuit are realized in a system in which the processor core operates at a first higher frequent clock frequency while components coupled to the processor, such as memory, operate at a lower frequency. In order to maintain electrical and timing compatibility, it is desirable to derive the lower clock frequency used to communicate with external components from the clock frequency utilized by the processor core. In the clock circuit of the present invention, the high frequency input clock signal is input to the clock circuit which has the ability to generate multiple lower frequency output signals. The actual signal output is programmable to conform to system clock requirements. Clock signals at the programmed lower frequency are then generated from the selected output signal.

47 Claims, 7 Drawing Sheets

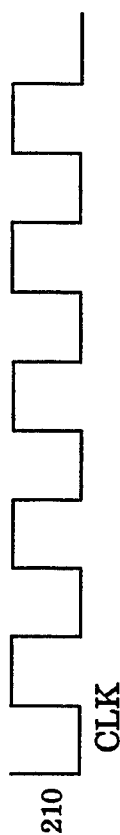
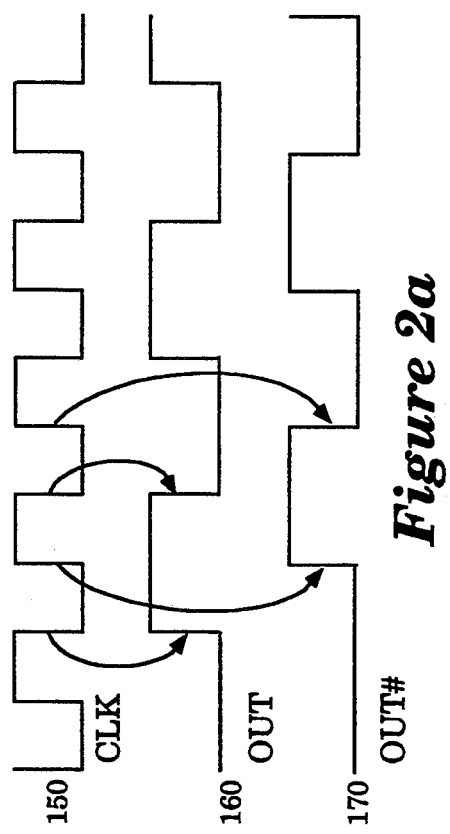
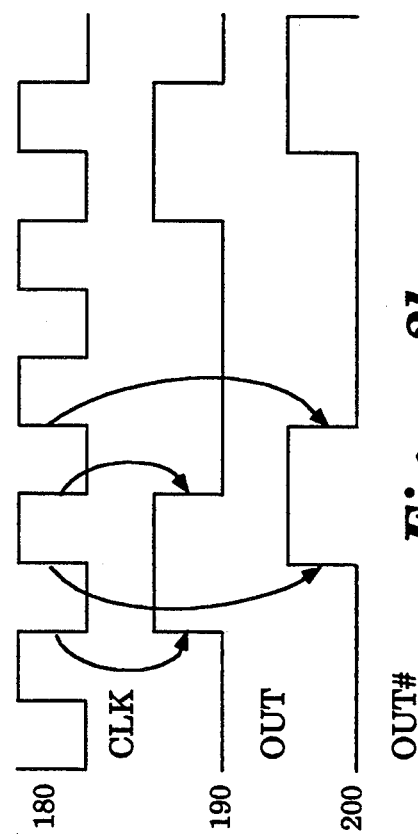
*Figure 2c*
*Figure 2a*
*Figure 2b*

PROGRAMMABLE CLOCK CIRCUIT

BACKGROUND OF THE INVENTION

1. Field of the Invention

The present invention is related to a circuit to generate different clock frequencies from the processor clock. More particularly, the present invention is directed to a pulse swallower circuit to generate clock signals in the processor to communicate with peripherals and the system bus.

2. Art Background

Processors are being developed which utilize faster and faster clock speeds and therefore achieve a higher performance. Furthermore, some processors include an internal cache which is able to operate at a higher frequency compared to the rest of the system. However, peripherals which couple to the processor are typically not able to operate at as high a clock speed. Therefore, in order to provide a clock signal at a slower speed while maintaining proper timing with the processor, a divide down circuit or pulse swallower circuit is typically implemented to generate a compatible but slower clock signal that is synchronized with the higher speed processor clock.

It is not uncommon that different peripherals have different clock requirements. Some peripherals are able to operate at speeds higher than other peripherals and therefore enable the system to achieve a higher throughput. It is therefore desirable to provide a pulse swallower circuit that is programmable to provide different clock speed outputs to communicate with peripherals having differing clock requirements. Furthermore, different systems may be configured to operate at different frequencies. Therefore, it is desirable to provide a programmable pulse swallower circuit that enables the same processor to be used in systems having varying clock frequencies.

SUMMARY OF THE INVENTION

The programmable clock circuit of the present invention provides the means to generate lower frequency clock signals from a higher clock frequency signal while maintaining the synchronous relationship of the signals as well as compatible electrical characteristics of the signal. The advantages to the circuit are realized in a system in which the processor core operates at a first higher clock frequency while components coupled to the processor, such as memory, operate at a lower frequency. In order to maintain electrical and timing compatibility, it is desirable to derive the lower clock frequency used to communicate with the external components from the clock frequency utilized by the processor core.

In the clock circuit of the present invention, the higher first clock frequency input is input to a gate having a data input and clock input wherein the data input is the output of the gate as determined by the falling edge of the clock input. The output signal of the gate is inverted in order to provide a changing data output value and is fed back to the data input. This first output signal also provides the equivalent of a divide by 2 clock signal.

The output of the inverter is also coupled via a second inverter to a second gate of the same type as the first gate, which generates an output signal based upon the falling edge of the input clock signal. The output of the first gate is also latched at the rising edge to provide a signal used to generate a second phase output signal, such as a signal $\frac{1}{2}$ a clock cycle behind the first output signal. The output of the second gate is inverted and logically ANDed with the output of the first inverter to produce a second output signal which is approximately $\frac{1}{3}$ the frequency of the input clock signal. This architecture is scalable and additional lower frequencies can be generated by continuing the combination of logic gate inverters and AND gates.

Switches are provided at the first and second outputs and are selected through an enable means in accordance with the timing requirements of the external components. These switches are programmed such that if the frequency of the external component is $\frac{1}{2}$ the frequency of the core of the processor, the circuit is programmed to output a clock signal generated from the first output signal. Similarly, if the external component operates at a frequency that is $\frac{1}{3}$ the frequency of the input clock signal, the switches are programmed to output the second output signal representative of $\frac{1}{3}$ of the input clock signal frequency.

To generate the actual output clock pulses utilized to communicate with the external components, the input clock signal is logically combined with the output signal of the circuit such that the input clock signal pulses are provided as the clock output only when the output signal of the circuit is in a predetermined state. Thus, for example, when the output signal of the circuit is in a high state, the clock pulses of the input clock signal are output as the clock signal to communicate with the external components. Preferably two phases of output clock signals are provided. The second phase is generated by a second output signal of the first gate which provides an output signal on the second edge, in this example the rising edge, of the clock input. Therefore, the second phase signal follows the first phase signal by one-half a clock cycle. As the feedback to the first logic gate is dependent on the selected output signal value, the second phase output signal follows the first phase output signal for each mode selected.

BRIEF DESCRIPTION OF THE DRAWINGS

The objects, features and advantages of the present invention will become apparent to one skilled in the art from the following detailed description in which:

FIG. 2a is a series of timing diagrams which illustrate a first set of output signals generated by the embodiment illustrated by FIG. 1. FIG. 2b is a series of timing diagrams which illustrate a second set of output signals generated by the embodiment illustrated by FIG. 1. FIG. 2c is a series of timing diagrams which illustrate a third set of output signals generated by the embodiment illustrated by FIG. 1.

DETAILED DESCRIPTION OF THE INVENTION

In the following description for purposes of explanation, numerous details are set forth in order to provide a thorough understanding of the present invention. However, it will be apparent to one skilled in the art that these specific details are not required in order to practice the invention. In other instances, well known electrical structures and circuits are shown in block diagram form in order not to obscure the present invention unnecessarily.

Figure 1:
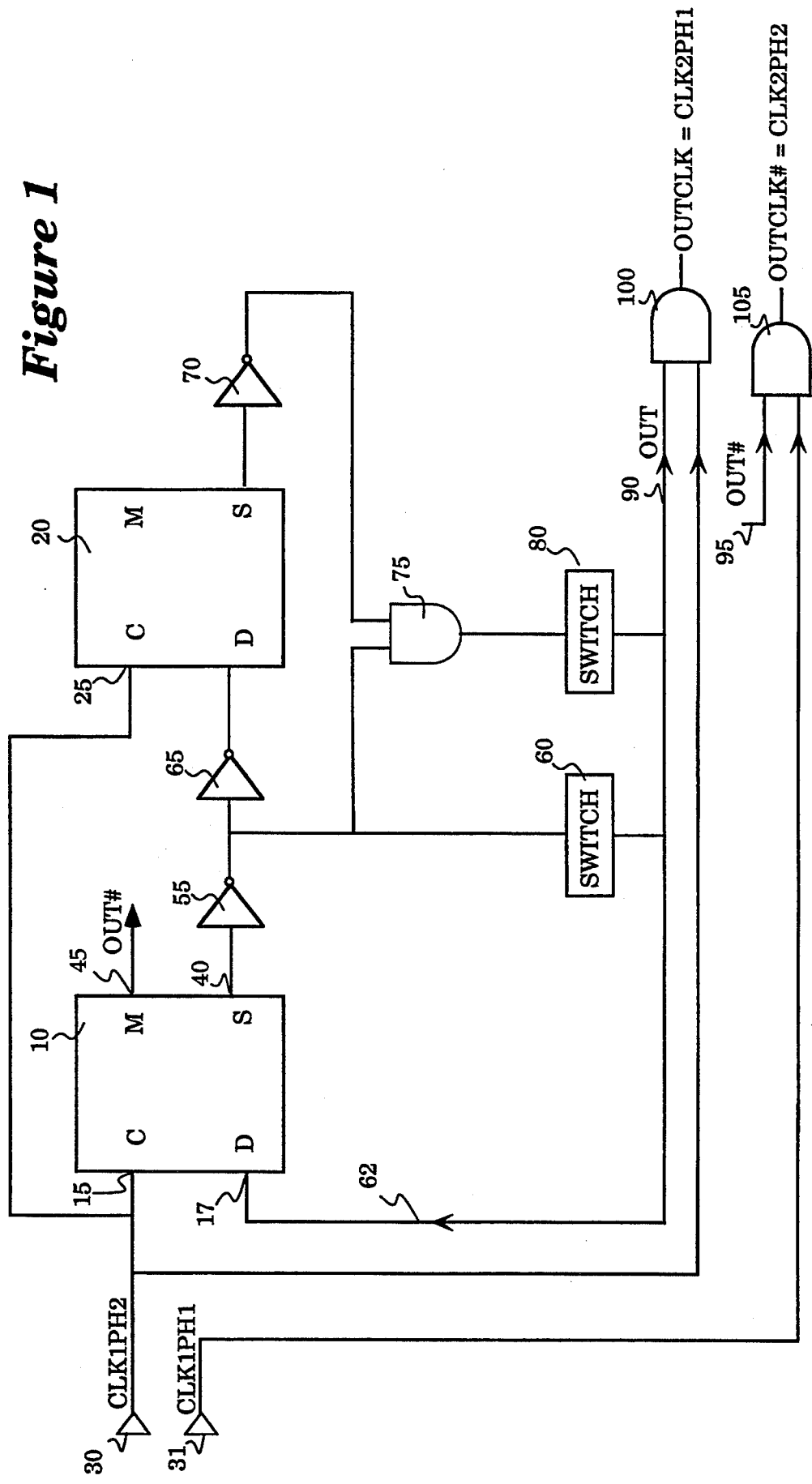
FIG. 1 is a block diagram circuit of one embodiment of the pulse swallower circuit of the present invention.

A block diagram of one embodiment of the programmable pulse swallower circuit of the present invention is shown in FIG. 1. The circuit consists of a first 10 and second 20 gate, both of which have a clock input 15, 25 which receives the high frequency input clock signal 30. The gates 10, 20 each function as a master/slave flip-flop which generate an output signal based upon the value of the signal at the data input 17 at the time clocked at the clock input 15, 25. The first output signal 40 of the first gate is generated at a first clock signal edge, for example, the falling edge of the clock input 30. The second output signal 45 of the first gate 10 generates an output on the second clock edge, for example, the rising edge of the clock input 30. Thus, two output signals are generated, the second following the first in phase, which are frequently needed in a processing system.

The output 40 of the first gate 10 is inverted by inverter 55 and input to switch 60. Switch 60 is enabled according to the frequency of output clock signals desired. The output value is then fed back through a feedback loop 62 to the data input 17 of the first gate 10 in order to provide the feedback signal for proper execution of the circuit. The output of inverter 55 is also input to a second inverter 65 to provide the data input value to the second gate 20.

The second gate 20 functions the same as the first gate 10 to generate an output signal based on the data input value at the first or falling edge of the clock input 25. The signal output from the second gate 20 is input to an inverter 70. The signal output by the inverter 70 is input to an AND gate 75 which also receives as input the output of inverter 55. The AND gate functions to logically combine the inverted output of the first gate 10 and the inverted output of the second gate 20 to generate an output signal at a lower frequency, in the present example at ⅓ the frequency of the clock input 30. The output of AND gate 75 is input to a second switch 80 which is selectively controlled to provide an output signal of the circuit. Thus, the state of switches 60 and 80 control the signal output 90 frequency and the frequency of the clock pulses generated therefrom, and furthermore provides the feedback signal input to the data input 17 of gate 10 which controls the generation of subsequent output signals in the circuit.

The selected output of switches 60 or 80 (OUT) and OUT# is logically combined with the corresponding phase input clock signal to generate clock pulses at the selected lower frequency. The input phase clock signal is combined with the OUT signal and a second phase clock signal input is combined with the OUT# signal. Specifically, in the present embodiment, the first phase output signal, OUT is logically combined with the corresponding phase input clock signal 30 (CLK1PH2) by AND gate 100 to generate a first phase pulse output clock signal and the second phase output signal 95 (OUT#) is logically combined with a second phase input clock signal (CLK1PH1) by AND gate 105 to generate a second phase pulse output clock signal. In the present embodiment, the input clock signal CLK1PH2 is utilized as the input clock signal to the circuit. However, it is readily apparent that other phases of the input clock signal can be used.

Figure 2D:
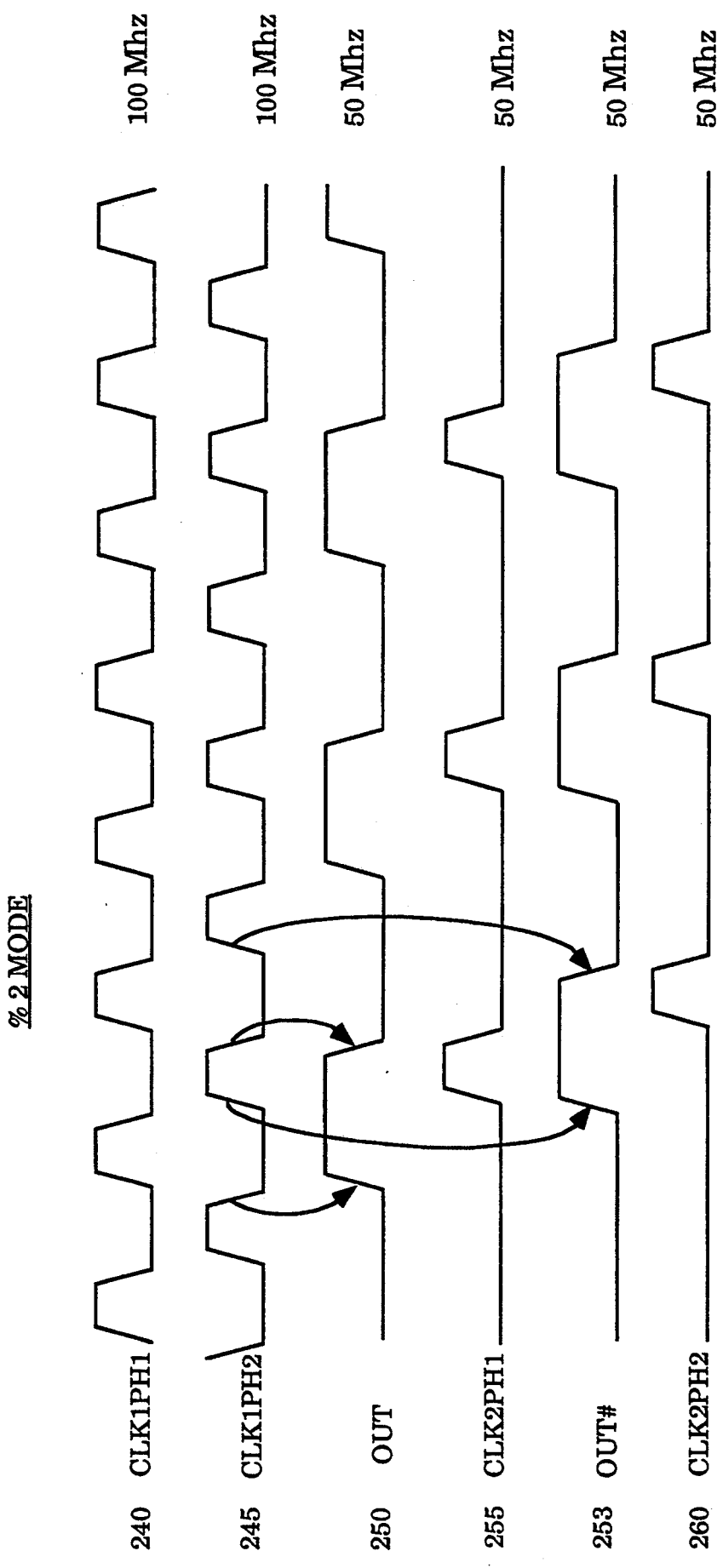
FIGS. 2d and 2e illustrate timing diagrams of output signals and corresponding clock signals generated by the embodiment of the pulse swallower circuit of the present invention illustrated by FIG. 1.

The output signals generated may best be understood by reference to the timing diagrams of FIGS. 2a, 2b, 2c, 2d and 2e. Referring to FIG. 2a, the first waveform 150 represents the clock input to the circuit. Using a pulse swallower circuit such as that shown in FIG. 1, a first phase output ("OUT") is generated at ½ the frequency of the input signal. This corresponds to the signal output by inverter 55 in FIG. 1 and is illustrated by the waveform 160. Similarly, the second phase output signal OUT# corresponds to the signal generated as output 45 from gate 10 and is illustrated by waveform 170. Preferably, OUT changes state at the falling edge of the input clock signal and OUT# changes state at the rising edge of the input clock signal. FIG. 2b represents signals generated which are approximately ⅓ of that of the input clock signal 180. Waveform 190 corresponds to the output of AND gate 75 of FIG. 1. Similarly, waveform 200 represents the second phase output signal (OUT#) at output 45 of logic gate 10 when the output frequency is selected to be ⅓ of the input clock signal frequency.

In the embodiment of the circuit described, the output signal can also be programmed to provide a clock signal at the frequency of the input clock signal. This is illustrated by the waveform of FIG. 2c. Therefore, the output signals OUT 220 and OUT# 230 are always maintained in a high state such that the clock pulses generated are of the same frequency as the input clock frequency 210.

Figure 2E:
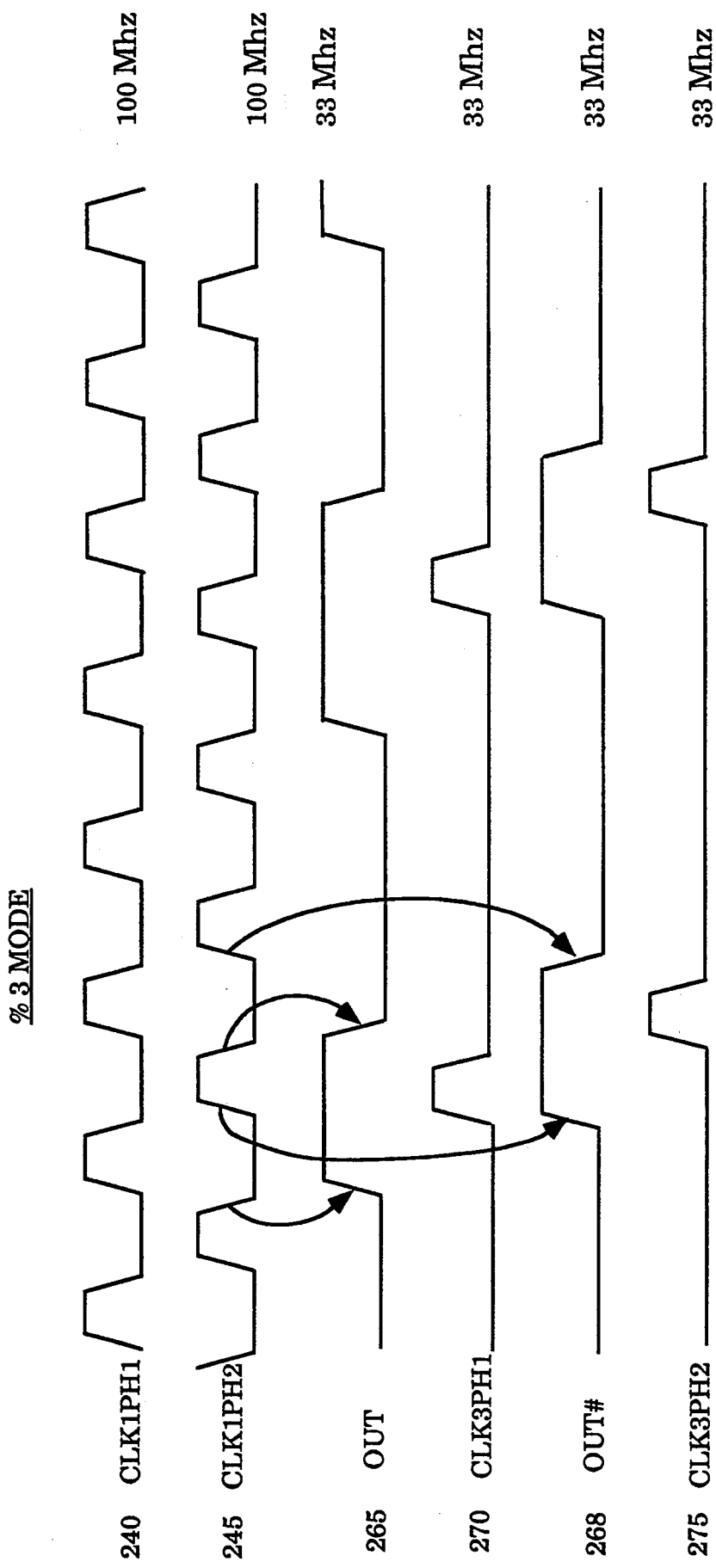

The clock pulses generated as output to communicate with the components coupled to the processor may best be visualized by reference to FIGS. 2d and 2e. For example, if the input clock is 100 MHz, as shown in waveforms 240 and 245, respectively representative of the first phase and second phase input clock signals, the output signal of the circuit selected to generate outputs at ½ the input frequency would generate OUT signal and OUT# signal of 50 MHz as illustrated by waveforms 250 and 253. Logically combining the OUT and OUT# waveforms 250, 253 with the corresponding phases of the input waveform 245, 240, generate the pulsed clock output at 50 MHz, one-half the input clock frequency of 100 MHz. This is illustrated by the waveforms 255 and 260. Referring to FIG. 2e, if the second mode is selected in which the output clock frequency is to be ⅓ of that of the input clock frequency, the OUT signal and OUT# signal generated would be that as represented by waveforms 265, 268 and the pulsed clock output generated therefrom would be that of waveforms 270 and 275.

Figure 3:
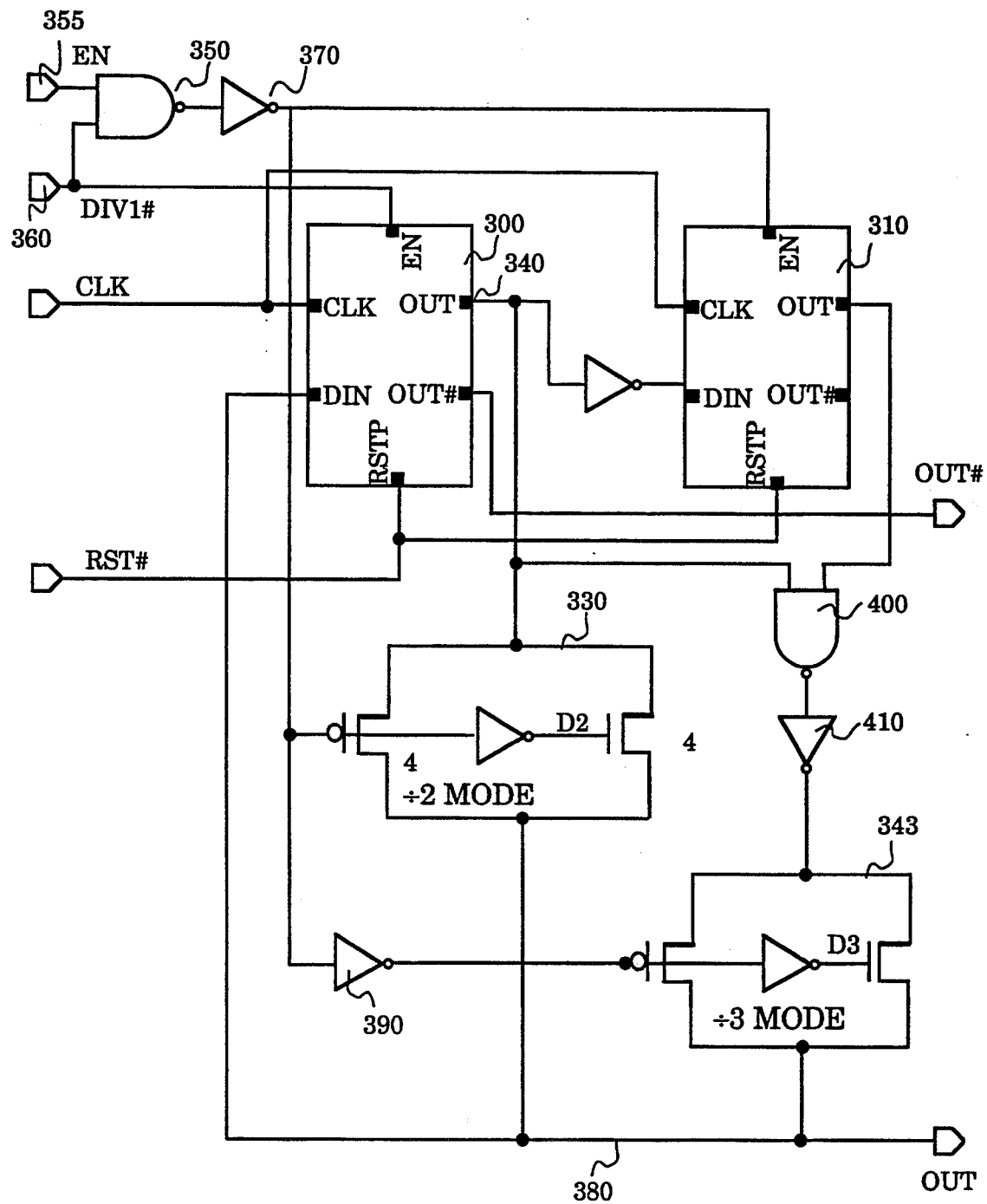
FIG. 3 is a component diagram of one embodiment of the pulse swallower circuit of the present invention.

A more detailed example of the pulse swallower circuit of the present invention is illustrated in FIG. 3. The circuit of FIG. 3 includes gates 300 and 310, switches 330, 343 and programmed enable means 350. The state of the circuit and its operation is programmable and is controlled by the inputs EN and DIV1# 355, 360. DIV1# is set when the output frequency to be utilized is programmed to be equal to the input frequency. Otherwise the input is reset to a value of one. The enable input EN 355 is reset to 0 when the circuit is to divide the inputs frequency by one-half and is set to 1 when the output frequency is to be ⅓ of the frequency of the input clock signal. In both cases the OUT# signal is taken from the output of gate 300. Thus, if the EN input 355 is set to a first state, in the present illustration a value of 0, the output of inverter 370 is equal to 0 which enables switch 330 to be conductive, thereby permitting the output 340 of gate 300 to be placed on output line 380. As the same signal output by inverter 370 is inverted by inverter 390, the switch 343 is nonconducting thereby preventing the signal generated by gate 310 to be output on output line 380. Similarly, if the EN signal is set to a value of 1, the output of the inverter 370 is a value of 1, disabling switch 330 and enabling switch 343 to permit the output signal that is generated by NAND gate 400 and inverter 410.

Figure 4:
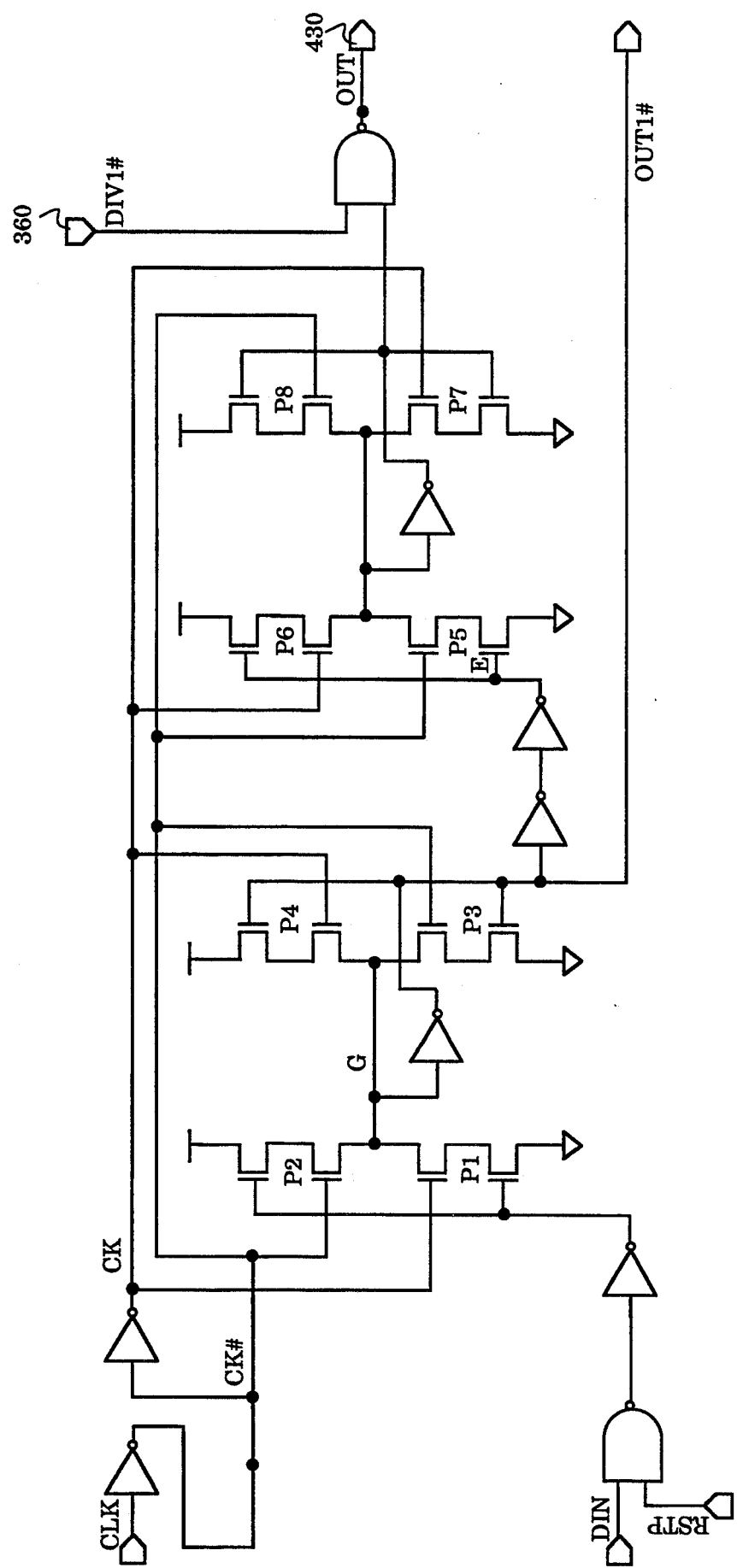
FIG. 4 illustrates an exemplary embodiment of the gates employed in the pulse swallower circuit of the present invention.

Further details of the present embodiment is shown in FIG. 4 which illustrates an exemplary structure of gates 300 and 310 and the generation of the first phase output signal "OUT" and the second phase output signal "OUT#". It should be noted that the DIV# signal 360 of FIG. 3 shown in FIG. 4 causes the value of the OUT signal 430 to be maintained in a 1 state if enabled in accordance with the mode programmed a divide by 1 circuit clock output. Thus, in the embodiment shown, clock pulses corresponding to the frequency of the input clock signal, corresponding to ½ of the frequency of the input clock signal and corresponding to ⅓ of the frequency of the input clock signal can be generated while maintaining consistent electrical characteristics and a synchronous relationship with the input clock signal.

Figure 5:
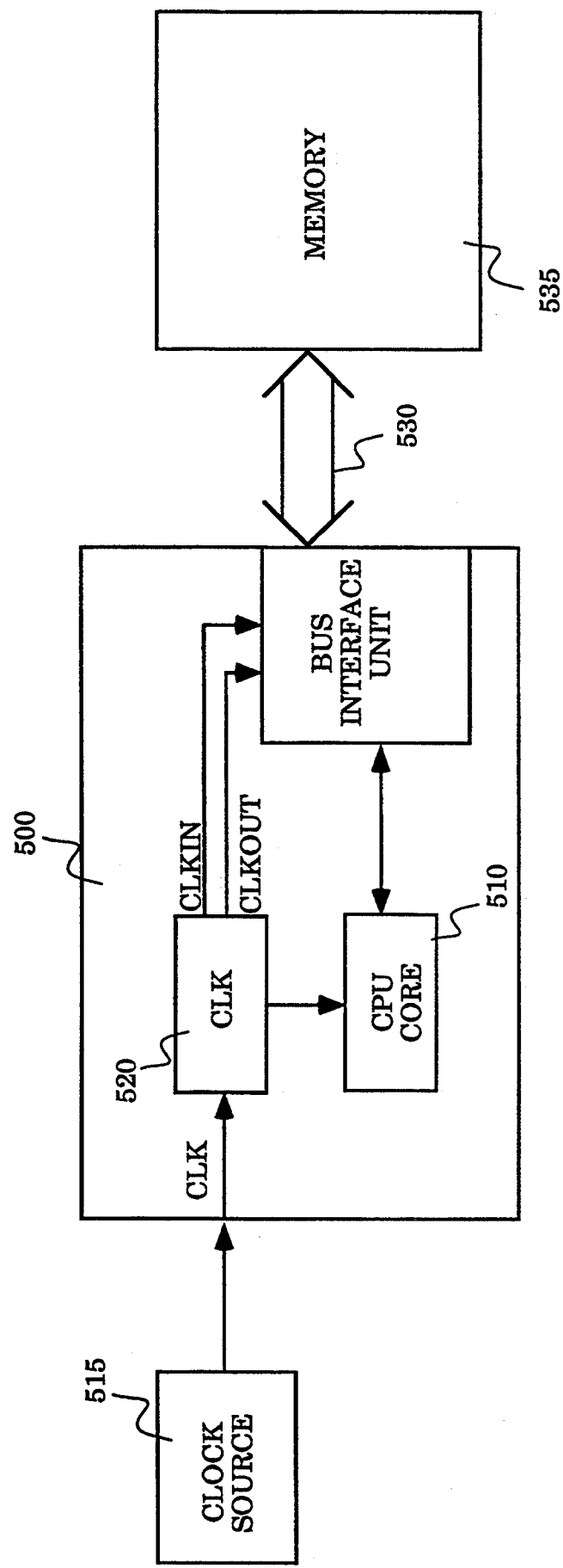
FIG. 5 is a block diagram of an exemplary processor system employing the pulse swallower circuit of the present invention.

The circuit may be used in a processor system such as the system illustrated by the simplified block diagram of FIG. 5. Referring to FIG. 5, the system may include a processor 500 which includes a CPU core 510 that operates at a frequency higher than that of peripheral devices such as bus 530 and memory 535. A pulse swallower clock circuit such as described herein 520 is utilized to generate synchronous but lower frequency clock signals to communicate with the other components of the system such as the bus 530 and memory 535.

It will be apparent to one skilled in the art that the clock circuit 520 as well as clock source 515 may be located on various places and components in the system. Clock source 515 generates a clock signal which is used to derive the high frequency clock signal used by the CPU core 510. In the present illustration, the clock source 515, which may be a crystal tuned to a predetermined frequency, generates a 50 MHz clock pulse signal. This is input to the clock circuit 520 which multiples the signal to generate a 100 Hz clock pulse signal which is utilized to drive the CPU core at 100 MHz. This 100 MHz signal is also used as input to pulse swallower circuit of the present invention which then generates a first phase and second phase signal used for the input and output clock signals, respectively, to communicate with the lower operating frequency components. As the circuit is programmable, the same clock circuit may be programmed so it can be placed in different systems with different frequency requirements, eliminating the need to generate separate hardware for adapting to different clock frequency systems. Furthermore, the architecture is scalable to provide for additional lower frequencies by adding logic gates and control signals consistent with the architecture shown in FIG. 1.

The invention has been described in conjunction with the preferred embodiment. It is evident that numerous alternatives, modifications, variations and uses will be apparent to those skilled in the art in view of the foregoing description.

What is claimed is:

1. A programmable circuit for generating lower frequency clock signals from a higher first frequency clock signal, said circuit comprising:
    a first logic gate having a data input and clock input, the gate generating an output corresponding to the input on a first edge of the clock input signal, said first frequency clock signal input to the clock input of the first logic gate;
    a first inverter coupled to receive as input an output of the first logic gate and generating a first inverted output;
    a second inverter which receives as data input the first inverted output of the first inverter and generates a second inverted output;
    a second logic gate having a data input and ock input, the gate generating an output corresponding to the input on a first edge of the clock input signal, said second logic gate receiving as data input the second inverted output of the second inverter, said first frequency clock signal input to the clock input;
    a third inverter coupled to receive the output of the second logic gate and generates a third inverted output;
    a logical AND gate to logically AND the first inverted output of the first inverter and the third inverted output of the third inverter;
    a first switch coupled to receive the first inverted output of the first inverter, said first switch, when in an enabled state, generating as output a second frequency clock signal slower than the first frequency clock signal;
    a second switch coupled to receive the output of the logical AND gate, said second switch, when in an enabled state, generating as output a third frequency clock signal slower than the first frequency clock signal.

2. The programmable circuit as set forth in claim 1, further comprising clock pulse generating means for generating output clock pulses comprising a logical combination means for combining an enabled clock frequency signal output by an enabled switch and a corresponding phase of the first frequency clock signal such that clock pulses of the first frequency clock signal are output when the enabled clock frequency signal is in a predetermined state, and clock pulses are generated at the enabled clock frequency.

3. The programmable circuit as set forth in clclaim 2, wherein clock pulses of the first frequency clock signal are output when the enabled clock frequency signal is in a high state.

4. The programmable circuit as set forth in claim 1, wherein the frequency of the second frequency clock signal corresponds to approximately one half of the frequency of the first frequency clock signal.

5. The programmable circuit as set forth in claim 1, wherein the frequency of the third frequency clock signal corresponds to approximately one third of the frequency of the first frequency clock signal.

6. The programmable circuit as set forth in claim 1, further comprising at least one additional logic gate coupled to the circuit to enable the generation of at least one additional output clock frequency signal at a lower frequency than the frequency of the first frequency clock signal.

7. The programmable circuit as set forth in claim 1, wherein clock signals comprise a first phase clock signal and a second phase clock signal, said second phase clock signal generated in accordance with a second edge of the clock input signal.

8. The programmable circuit as set forth in claim 7, wherein the second phase clock signal of the second clock frequency signal and third clock frequency signal are generated by a second output of the first logic gate which outputs the data input signal on the second edge of the clock input.

9. The programmable circuit as set forth in claim 8, wherein the first edge is the falling edge and the second edge is the rising edge of the clock input signal.

10. The programmable circuit as set forth in claim 1, further comprising a controller for selectively enabling the first and second switches.

11. The programmable circuit as set forth in claim 10, wherein said controller further comprises means to output said first frequency clock signal.

12. A programmable circuit for generating lower clock frequencies from a higher first clock frequency, said circuit comprising:
   a first gate means having a data input and clock input, the gate means generating an output corresponding to the input on an edge of a clock input signal, said first frequency clock signal input to the clock input of the first gate means;
   a first inverter means coupled to receive as input an output of the first gate means and generating a first inverted output;
   a second inverter means coupled to receive as data input the first inverted output of the first inverter means and generates a second inverted output;
   a second gate means having a data input and clock input, the gate means generating an output corresponding to the input on an edge of the clock input, said second gate means receiving as data input the second inverted output of the second inverter means, said first clock frequency input to the clock input;
   a third inverter means coupled to receive the output of the second gate means and generates a third inverted output;
   ANDing means to logically AND the first inverted output of the first inverter and the third inverted output of the third inverter means;
   a first switch means coupled to receive the first inverted output of the first inverter means, said first switch, when in an enabled state, generating as output a second frequency clock signal slower than the first frequency clock signal;
   a second switch means coupled to receive the output of the ANDing means, said second switch, when in an enabled state, generating as output a third frequency clock signal slower than the first frequency clock signal.

13. The programmable circuit as set forth in claim 12, further comprising clock pulse generating means for generating output clock pulses comprising a logical combination means for combining an enabled clock frequency signal output by an enabled switch means and a corresponding phase of the first frequency clock signal such that clock pulses of the first frequency clock signal are output when the enabled clock frequency signal is in a predetermined state, and clock pulses are generated at the enabled clock frequency.

14. The programmable circuit as set forth in claim 13, wherein clock pulses of the first frequency clock signal are output when the enabled clock frequency signal is in a high state.

15. The programmable circuit as set forth in claim 12, wherein the frequency of the second frequency clock signal corresponds to approximately one half of the frequency of the first frequency clock signal.

16. The programmable circuit as set forth in claim 12, wherein the frequency of the third frequency clock signal corresponds to approximately one third of the frequency of the first frequency clock signal.

17. The programmable circuit as set forth in claim 12, further comprising at least one additional gate means coupled to the circuit to enable the generation of at least one additional output clock frequency signal at a lower frequency than the frequency of the first frequency clock signal.

18. The programmable circuit as set forth in claim 12, wherein clock signals comprise a first phase clock signal and a second phase clock signal, said second phase clock signal generated in accordance with a second edge of the clock input signal.

19. The programmable circuit as set forth in claim 18, wherein the second phase clock signal of the second clock frequency signal and third clock frequency signal are generated by a second output of the first gate means which outputs the data input signal on the second edge of the clock input signal.

20. The programmable circuit as set forth in claim 19, wherein the first edge is the falling edge and the second edge is the rising edge of the clock input signal.

21. The programmable circuit as set forth in claim 12, further comprising a control means for selectively enabling the first switch means and second switch means.

22. The programmable circuit as set forth in claim 21, wherein said control means further comprises means to output said first frequency clock signal.

23. A processing system comprising:
   a processor driven by a processor clock signal operating at a processor clock frequency;
   at least one component coupled to the processor;
   an input clock means for providing an input clock signal to the processing system;
   a processor clock means for generating the processor clock signal from the input clock signal;
   a clock circuit coupled to the processor clock means for generating lower frequency clock signals from the processor clock signal, said lower frequency clock signals utilized by the processor to communicate with the component, which operates at a clock frequency lower than the frequency of the processor clock signal, said clock circuit comprising;
      a first gate means having a clock input coupled to receive the processor clock signal and a data input, the gate means generating an output corresponding to the input on an edge of the processor clock signal,
      a first inverter means coupled to receive as input an output of the first gate means and generating a first inverted output;
      a second inverter means which receives as data input the first inverted output of the first inverter means and generates a second inverted output;
      a second gate means having a clock input coupled to receive the processor clock signal and a data input, the second gate means generating an output corresponding to the input on an edge of the processor clock signal, said second gate means receiving as data input the second inverted output of the second inverter means, said first frequency clock signal input to the clock input;

a third inverter means coupled to receive the output of the second gate means and generates a third inverted output;

ANDing means to logically AND the first inverted output of the first inverter and the third inverted output of the third inverter means;

a first switch means coupled to receive the first inverted output of the first inverter means, said first switch, when in an enabled state, generating as output a second frequency clock signal slower than the first frequency clock signal;

a second switch means coupled to receive the output of the ANDing means, said second switch, when in an enabled state, generating as output a third frequency clock signal slower than the first frequency clock signal.

24. The processing system as set forth in claim 23, wherein the component comprises memory.

25. The processing system as set forth in claim 23, wherein the at least one component and processor is coupled by a bus operating at the component clock frequency.

26. The processing system as set forth in claim 23, wherein said input clock means generates an input clock signal at a frequency different from the processor clock frequency.

27. The processing system as set forth in claim 23, wherein the processor clock means comprises a multiplier circuit to generate the processor clock signal.

28. The processing system as set forth in claim 23, wherein the input clock means is external to the processor.

29. The processing system as set forth in claim 23, wherein said clock circuit further comprising clock pulse generating means for generating output clock pulses comprising a logical combination means for combining the enabled clock frequency signal and a corresponding phase of the first clock frequency signal such that clock pulses of the first frequency clock signal are output when the enabled clock frequency signal is in a predetermined state, and clock pulses are generated at the enabled clock frequency.

30. The processing system as set forth in claim 29, wherein clock pulses of the first frequency clock signal are output when the enabled clock frequency signal is in a high state.

31. The processing system as set forth in claim 23, wherein the frequency of the second frequency clock corresponds to approximately one half of the frequency of the first frequency clock.

32. The processing system as set forth in claim 23, wherein the frequency of the third frequency clock signal corresponds to approximately one third of the frequency of the first frequency clock signal.

33. The processing system as set forth in claim 23, wherein the clock circuit further comprises at least one additional gate means to enable the generation of at least one additional output clock frequency signal at a lower frequency than the frequency of the first frequency clock signal.

34. The processing system as set forth in claim 23, wherein said control means further comprises means to output said first frequency clock signal.

35. The processing system as set forth in claim 23, wherein clock signals comprise a first phase clock signal and a second phase clock signal, said second phase clock signal generated in accordance with a second edge of the clock input signal.

36. The processing system as set forth in claim 35, wherein the second phase clock signal of the second clock frequency signal and third clock frequency signal are generated by a second output of the first gate means which outputs the data input signal on the second edge of the clock input signal.

37. The processing system as set forth in claim 36, wherein the first edge is the falling edge and the second edge is the rising edge of the clock input signal.

38. A method for programmably generating lower clock frequency signals from a higher first frequency clock signal, comprising the steps of:

generating a first output signal by gating a first data input signal according to a first edge of the first frequency clock signal;

inverting the first output signal;

providing the inverted first output signal as the first data input signal, said first inverted output signal further representative of a first lower frequency clock signal;

inverting the inverted first output signal to generate a second data input signal;

generating a second output signal by gating the second data input signal according to the first edge of the first frequency clock signal;

inverting the second output signal;

logically ANDing the inverted first output signal and inverted second output signal to generate a third output signal, said third output signal representative of a second lower frequency clock signal.

39. The method as set forth in claim 38, further comprising the step of selecting an output signal from the first lower frequency clock signal and the second lower frequency clock signal.

40. The method as set forth in claim 39, wherein said step of selecting comprises the step of controlling switches which selectively couple the first and second lower frequency clock signal as the output clock signal.

41. The method as set forth in claim 38, further comprising the step of selecting an output clock signal from the higher first frequency clock signal the first lower frequency clock signal and the second lower frequency clock signal.

42. The method as set forth in claim 38, further comprising the step of generating output clock pulses by logically combining the enabled clock frequency signal and a corresponding first clock frequency signal such that clock pulses of the first clock frequency signal are output when the enabled clock frequency signal is in a predetermined state, and clock pulses are generated at the enabled clock frequency.

43. The method as set forth in claim 38, wherein the first lower clock frequency corresponds to approximately one half of the first clock frequency.

44. The method as set forth in claim 38, wherein the second lower clock frequency corresponds to approximately one third of the first clock frequency.

45. The method as set forth in claim 38, further comprising the steps of generating additional lower frequency clock signals by generating additional output signals and logically combining the output signals to generate the additional lower frequency clock signals.

46. The method as set forth in claim 38, wherein clock signals comprise a first phase clock signal and a second phase clock signal, and the second phase clock signal of the second clock frequency signal and third clock frequency signal are generated by gating a first data input signal according to a second edge of the first frequency clock signal.

47. The method as set forth in claim 46, wherein the first edge is the falling edge and the second edge is the rising edge of the first frequency clock signal.

* * * * *

UNITED STATES PATENT AND TRADEMARK OFFICE
CERTIFICATE OF CORRECTION

PATENT NO. : 5,345,109
DATED : September 6, 1994
INVENTOR(S) : Anup S. Mehta

It is certified that error appears in the above-indentified patent and that said Letters Patent is hereby corrected as shown below:

Col. 6, Line 19    Delete "ock"    Insert --clock--

Col. 6, Line 53    Delete "clclaim"    Insert --claim--

Signed and Sealed this

Twenty-seventh Day of June, 1995

Attest:

BRUCE LEHMAN

*Attesting Officer*    *Commissioner of Patents and Trademarks*